United States Patent
Nakatani et al.

(10) Patent No.: US 6,802,223 B2
(45) Date of Patent: Oct. 12, 2004

(54) CAPACITATIVE ELECTROMAGNETIC FLOW METER

(75) Inventors: Hiroshi Nakatani, Tokyo (JP); Tatsuya Kimura, Tokyo (JP); Yoshito Sameda, Kanagawa-ken (JP); Takuya Iijima, Tokyo (JP); Takashi Higuchi, Tokyo (JP); Makoto Futoo, Kanagawa-ken (JP); Hiroaki Nojiri, Tokyo (JP); Kiyonori Nishikawa, Tokyo (JP); Toshihiko Okamoto, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/669,565

(22) Filed: Sep. 25, 2003

(65) Prior Publication Data

US 2004/0123670 A1 Jul. 1, 2004

(30) Foreign Application Priority Data

Sep. 25, 2002 (JP) .................................. 2002-278426
Nov. 29, 2002 (JP) .................................. 2002-346918
Jun. 13, 2003 (JP) .................................. 2003-169705

(51) Int. Cl.⁷ .................................................. G01F 1/58
(52) U.S. Cl. .................................................. 73/861.12
(58) Field of Search ........................... 73/861, 861.08, 73/861.11, 861.12, 861.15

(56) References Cited

U.S. PATENT DOCUMENTS 5,207,105 A * 5/1993 Fukunaga et al. ....... 73/861.12
5,458,003 A * 10/1995 Ishihara et al. .......... 73/861.12
5,880,376 A * 3/1999 Sai et al. .................. 73/861.08
2003/0051557 A1 * 3/2003 Ishikawa et al. ......... 73/861.12

FOREIGN PATENT DOCUMENTS

| JP | 2932448 | 5/1999 |
| JP | 3047282 | 3/2000 |
| JP | 3047283 | 3/2000 |

* cited by examiner

Primary Examiner—Edward Lefkowitz
Assistant Examiner—T Miller
(74) Attorney, Agent, or Firm—Oblon, Spivak, McClelland, Maier & Neustadt, P.C.

(57) ABSTRACT

The invention consists in a capacitative electromagnetic flow meter in which excitation is performed at a frequency above the commercially available frequency and having a characteristic correction filter that corrects the gain frequency characteristic of the exciting current such that the exciting flux waveform has a flat section. In the detection unit, the value of the electrostatic capacitance between the face electrodes 4A, 4B and guard electrodes 5A, 5B is made smaller than the value of the electrostatic capacitance between the detecting face electrodes 4A, 4B and the fluid to be measured. The exciting coils are fixed to a cylindrical yoke, being electrostatically screened by coil fixing plates. Fixing by an earth ring is performed with this cylindrical yoke and the two ends of the measurement tube being symmetrical with respect to the tube axis and electrode axes. In addition, fixing is effected by filling the entire interior of the detection unit with epoxy resin.

7 Claims, 15 Drawing Sheets

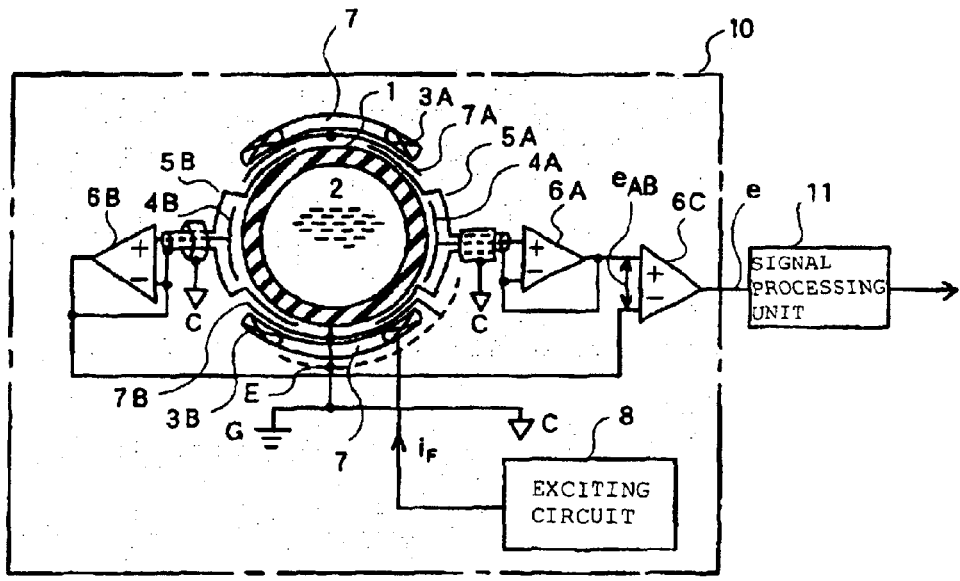
FIG. 1 ( PRIOR ART )
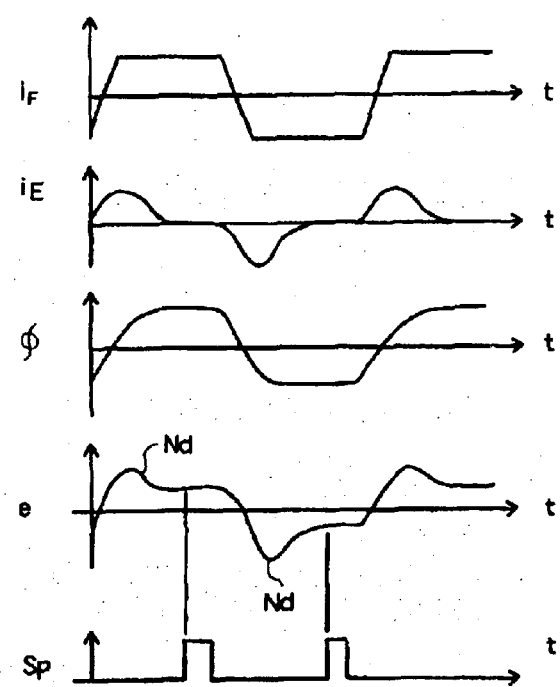
FIG. 2 A (PRIOR ART)
FIG. 2 B (PRIOR ART)
FIG. 2 C (PRIOR ART)
FIG. 2 D (PRIOR ART)
FIG. 2 E (PRIOR ART)

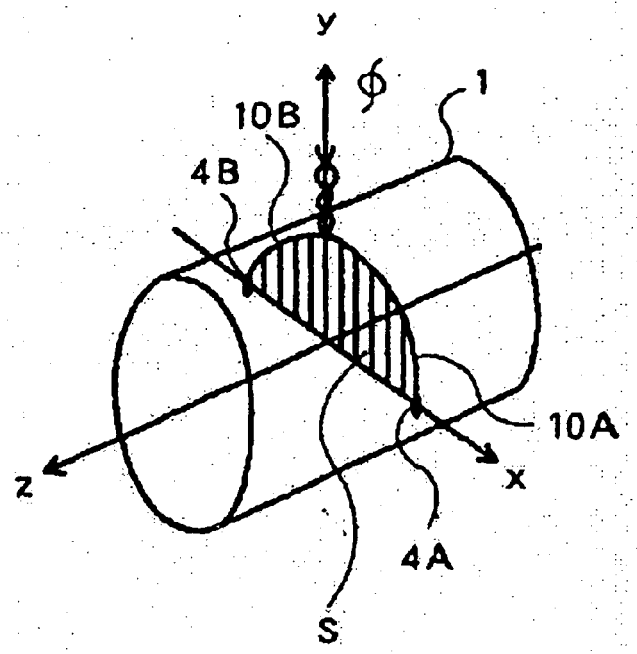
FIG. 8
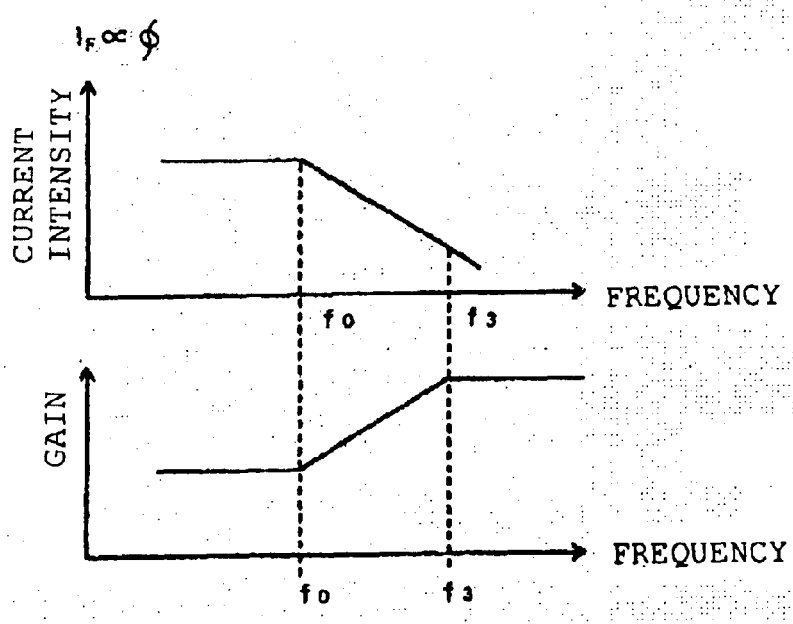
FIG. 9 A
FIG. 9 B

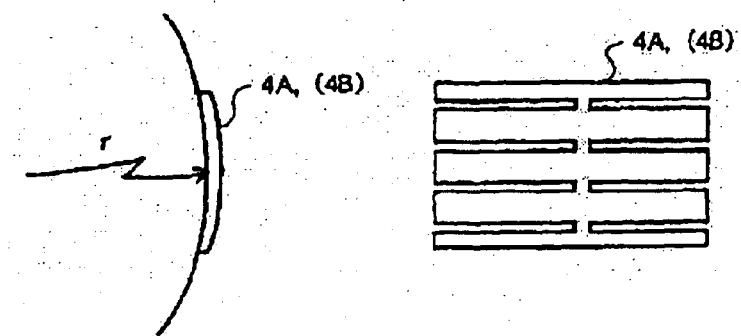
FIG. 1 3 A   FIG. 1 3 B
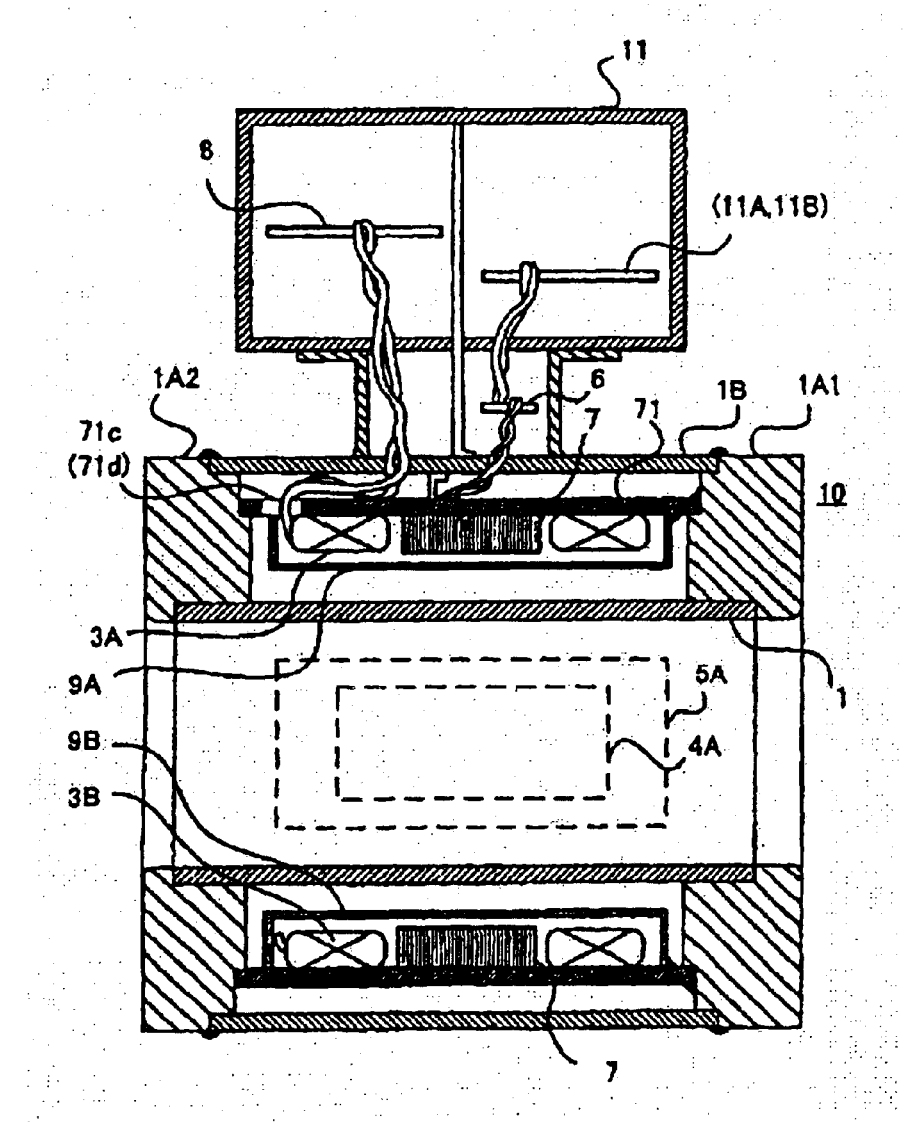
FIG. 1 4

CAPACITATIVE ELECTROMAGNETIC FLOW METER

CROSS-REFERENCE TO RELATED APPLICATION

This application claims benefit of priority to Japanese application numbers JP 2002-278426 filed Sep. 25, 2002, JP 2002-346918 filed Nov. 29, 2002 and JP 2003-169705 filed Jun. 13, 2003, the entire content of which is incorporated by reference herein.

BACKGROUND OF THE INVENTION

1. Field of the Invention

The present invention relates to an electromagnetic flow meter that measures the flow rate of a fluid to be measured that is flowing through a measurement tube, and more particularly relates to a capacitative electromagnetic flow meter.

2. Description of the Related Art

There are two types of electromagnetic flow meter, namely, the liquid-contacting electrode type electromagnetic flow meter, in which an electrode is directly in contact with the fluid to be measured and the electro motive force (hereinbelow called the e.m.f.) generated in the fluid to be measured is directly detected, and the non-liquid-contacting electrode type electromagnetic flow meter (hereinbelow termed a capacitative electromagnetic flow meter), in which the electrode is not directly in contact with the fluid to be measured and the e.m.f. generated in the fluid be measured is detected through the electrostatic capacitance between the fluid to be measured and the electrodes.

Furthermore, an electromagnetic flow meter is required to obtain a stable flow rate signal from which the effect of noise has been removed. However, this noise has various causes, so a large number of types of electromagnetic flow meter exist, depending on the different means used to effect such removal (see for example Laid-open Japanese Patent Publication No. H. 8-304132 (referred to as Patent Reference 1)).

Various types of anti-noise measures are known that have been subsequently developed to improve the capacitative electromagnetic flow meter disclosed in this Patent Reference 1 (for example Laid-open Japanese Patent Publication No. 2001-116598 (referred to as Patent Reference 2)). The construction and action of these will be described with reference to FIG. 1 to FIG. 3.

First of all, the construction thereof will be described with reference to FIG. 1. As shown in this Figure, this capacitative electromagnetic flow meter comprises a detection unit 10 and a signal processing unit 11 that is used to find the flow rate from the detected signal e detected by the detection unit 10.

The detection unit 10 applies magnetic flux by forming a return magnetic circuit, not shown, with respect to the fluid 2 to be measured, by passing an exciting current $i_F$ from an exciting circuit 8 to exciting coils 3A, 3B wound on magnetic poles 7 arranged facing the outer wall of the measurement tube 1, made of an insulating substance, through which the fluid 2 to be measured flows.

Amplifiers 6A, 6B are used to amplify the e.m.f. proportional to the flow rate of the fluid 2 to be measured, mentioned above, through the electrostatic capacitance between a pair of face electrodes 4A, 4B that are arranged facing the outer wall of the tube 1 where measurement is conducted in a direction orthogonal to the direction of this magnetic flux and guard electrodes 5A, 5B and the measurement tube 1 and the respective face electrodes 4A, 4B referred to above, and between the face electrodes 4A, 4B and guard electrodes 5A, 5B arranged so as to cover these face electrodes 4A, 4B and, in addition a difference amplifier (or differential amplifier) 6C amplifies the difference $e_{AB}$ of the respective signals from the amplifiers 6A, 6B, thereby performing detection of the detection signal e.

Next, flow rate measurement is conducted by passing this detection signal e to a signal processing unit 11, which samples positions other than the region of rise of the detection signal e (termed differentiation noise).

In this system, the impedance between the face electrodes 4A, 4B and the fluid 2 to be measured is extremely high, so various types of anti-noise measures are provided in the detection unit 10.

One of these anti-noise measures is in respect of noise that is induced between the face electrodes 4A, 4B. This anti-noise measure involves maintaining the guard electrodes 5A, 5B at the same potential as the face electrodes 4A, 4B and removing noise induced in the same phase between the face electrodes 4A and 4B by performing amplification by the difference amplifier 6C after impedance conversion using the amplifiers 6A, 6B.

Also, in the magnetic flux circuit between the guard electrodes 5A, 5B and the exciting coils 3A, 3B, damping foil 7A, 7B, to be later described, may be arranged.

In addition, grounding of such a detection unit 10 is achieved by connecting to ground G by connecting the earth E of a metal pipe casing liquidly connected with the periphery, not shown of the measurement tube 1 and a common potential earth C of the circuit.

Noise, called differentiation noise, as described above, is superimposed on the detection signal e of a capacitative electromagnetic flow meter constructed in this way.

This noise is induced in the detection loop formed between the two face electrodes 4A, 4B and the amplifier 6A, 6B by induction due to electromagnetic coupling with the exciting magnetic flux and the difference of the potential fluctuations between the two ground points G and the respective face electrodes 4A, 4B that occur when the exciting magnetic flux fluctuates is superimposed on the rising portion of the detection signal e as noise.

The details of this will be described using FIG. 2A, FIG. 2B, FIG. 2C, FIG. 2D and FIG. 2E. When a square wave exciting current $i_F$ as shown in FIG. 2A flows in the exciting coils 3A, 3B, the rising portion of the exciting magnetic flux $\Phi$ shows a waveform whose characteristic is somewhat blunted by the response time constant of the diamagnetic field action in the exciting magnetic circuit, as shown in FIG. 2C, by the eddy current $i_E$ generated in the exciting magnetic flux path, as shown in FIG. 2B.

Due to these changes of the exciting magnetic flux $\Phi$, noise in differential form i.e. differentiation noise is superimposed on the rising portion of the detection signal e as described above, as in the portion $N_d$ in FIG. 2D.

It is therefore necessary for the construction within the detector 10 to be set up and arranged such that the eddy current $i_E$ generated in the exciting magnetic circuit is kept to a minimum.

Also, in order to detect the stable component of the flow rate signal, as shown in FIG. 2E, the flow rate is found by sampling with the timing of a sampling signal $S_P$ at which the value of the differentiation noise has become small.

Apart from the differentiation noise described above, low-frequency noise, called "fluid noise" is superimposed on the detection signal e. The mechanism of generation of this fluid noise is inferred to be that low-frequency potential fluctuations are produced in the fluid 2 to be measured, due to irregular movements of the ions that are transported by the fluid 2 to be measured. Such fluid noise increases when the flow rate of the fluid 2 to be measured becomes faster.

In order to separate this fluid noise and the e.m.f. that is proportional to the flow rate, the frequency of the exciting current is made higher than the frequency of the commercial supply (or commercial frequency) and the exciting circuit is set such that the flux waveform settles down in a short time.

However, since the inductance of the exciting coils 3A, 3B has a characteristic having a resonant point in the high frequency region in the vicinity of 50 kHz, the phenomenon of oscillation of the exciting current $i_F$ as shown in FIG. 3 still occurs even though the exciting current $i_F$ is controlled with high frequency.

For this reason, thin conductive sheets called damping foils 7A, 7B are provided between the exciting coils 3A, 3B and the guard electrodes 5A, 5B in order to eliminate the resonant point of the oscillation.

As described above, in a conventional capacitative electromagnetic flow meter, the excitation frequency of the exciting current is made higher than the commercially supplied frequency in order to avoid the effect of fluid noise and damping foil is provided in the flux path in order to suppress oscillation of the exciting current produced by this raising of the exciting frequency.

However, since such damping foil exists, because it is arranged in the flux path, generation of eddy currents cannot be avoided and the problem arises of fluctuations of potential on the damping foil being detected as noise, due to electrostatic coupling with the exciting coils. There were therefore, in addition, the drawbacks that the construction was complicated due to the need for anti-noise measures such as the requirement to provide measures such as arranging an insulating layer between the guard electrodes and the damping foil.

Also, as described above, since the output impedance from the face electrodes is extremely high, the input impedance of the amplifier needs to have a high value of the order of a few G Ω. Slight changes in the insulating characteristics of this portion produce errors of measurement, so the interior of the measurement tube around the face electrodes and guard electrodes was filled with epoxy resin, with the object of preventing any decrease in insulation.

However, if the method was adopted of fixing these components by packing with epoxy resin, stress was generated between the face electrodes and guard electrodes when this heated resin contracted, causing cracks, with the risk of decrease in insulation. Furthermore, since the face electrodes and guard electrodes were of large size, if mechanical vibration of the entire detection unit was produced by the fluid flowing through the interior during measurement, differences were produced in the output impedance of the two face electrodes, resulting in the production of induction noise. Also, friction noise was generated by the vibration of the signal cable.

SUMMARY OF THE INVENTION

Accordingly, one object of the present invention is to provide a novel, stable capacitative electromagnetic flow meter which is little affected by differentiation noise (electromagnetic induction noise) or electrostatic induction noise or friction noise and which is little affected by fluid noise and with excellent resistance to vibration and humidity, by reducing to the utmost problems generated by the diamagnetic effect in the flux path.

In order to achieve the above object, the present invention is constituted as follows. Specifically, according to the present invention, a capacitative electromagnetic flow meter comprises:

a measurement tube made of insulating material through which flows a fluid to be measured;

an exciting coil wound on a magnetic pole arranged facing the periphery of the measurement tube, that supplies flux in a direction orthogonal to the tube axis direction of the measurement tube;

a pair of face electrodes arranged facing the periphery of the outer wall of the measurement tube in directions respectively orthogonal to the direction of the flux and the tube axis direction of the measurement tube;

guard electrodes arranged so as to cover the face electrodes from the periphery thereof, maintaining a prescribed separation with the face electrodes;

an exciting circuit that supplies exciting current of a frequency of at least the commercially available frequency to the exciting coil;

a pre-amplifier that amplifies the detection signal detected through the electrostatic capacitances between the fluid to be measured and the pair of face electrodes, respectively, and between these face electrodes and the respective guard electrodes;

a cable whereby the face electrodes and guard electrodes are connected with the pre-amplifier;

a signal processing unit that outputs the flow rate of the fluid to be measured from an output signal of the pre-amplifier;

a cylindrical yoke forming a magnetic return circuit of the exciting magnetic field arranged coaxially with the measurement tube and so as to cover the periphery of the exciting coil;

a coil fixing plate of non-magnetic material electrically connected and fixed to the cylindrical yoke, covering the exciting coil; and earth rings provided at both ends of the measurement tube, whereby a metal pipe that is coaxially arranged with this cylindrical yoke and the cylindrical yoke are arranged and fixed symmetrically and electrically connected with respect to the axis connecting the centers of the pair of face electrodes and the tube axis of the measurement tube, at the periphery of the cylindrical yoke; wherein the exciting circuit comprises filter means that controls the waveform of the exciting current such that the exciting flux waveform has a flat section; and the value of the electrostatic capacitance formed between the face electrodes and the guard electrodes is smaller than the value of the electrostatic capacitance between the fluid to be measured and the face electrodes.

Consequently, since, according to the present invention, the frequency of the exciting current is high and is controlled within a prescribed settling time, damping foil is unnecessary and eddy currents of the magnetic circuit are suppressed, thereby making it possible to arrange for the exciting flux waveform to have a flat section, so flow rate measurement can be achieved in a stable fashion with high accuracy without being subject to the effects of differentiation noise, electrostatic noise or fluid noise.

Also, since electrostatic induction noise from the exciting coils is screened by the coil fixing plate and the electrostatic capacitance between the face electrodes and the guard electrodes is small and the amplification gain of the induction noise superimposed on the detection signal is low, a capacitative electromagnetic flow meter can be obtained that is resistant to induction noise.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is a layout diagram showing prior art;

FIG. 2A, FIG. 2B, FIG. 2C, FIG. 2D and FIG. 2E are diagrams showing the operation of the prior art;

FIG. 8 is a diagram of principles of the present invention;

FIG. 9A and FIG. 9B are diagrams of the characteristic of an exciting circuit according to the first embodiment of the present invention;

FIG. 13A and FIG. 13B are diagrams of the shape of the face electrodes according to the first embodiment of the present invention;

FIG. 14 is a side view of a detection unit according to a second embodiment of the present invention;

DETAILED DESCRIPTION OF THE PREFERRED EMBODIMENTS

First Embodiment

Figure 3:
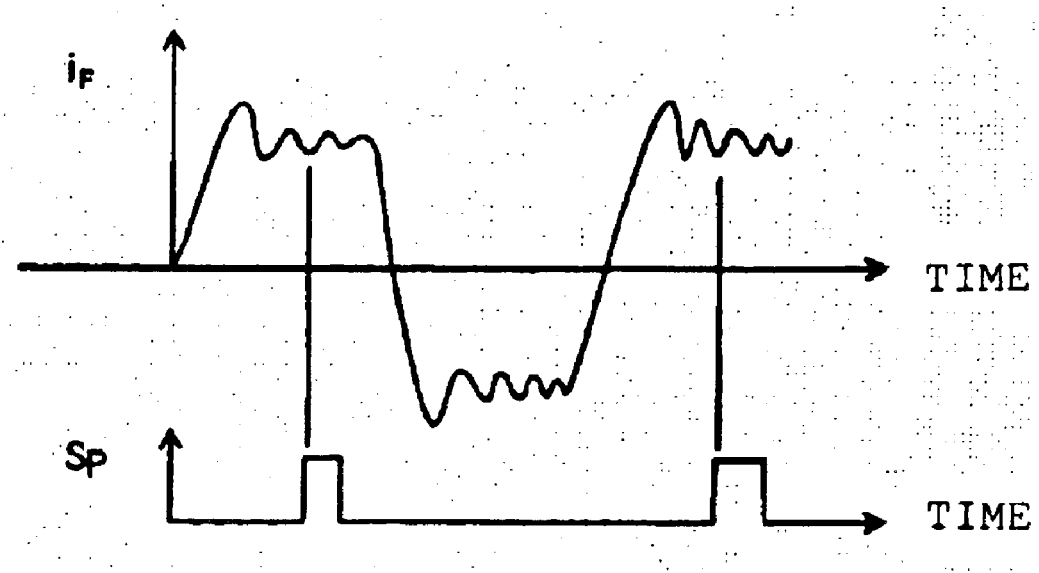
FIG. 3 is a diagram showing the action of the prior art.

Referring now to the drawings, wherein like reference numerals designate identical or corresponding parts throughout the several views, and more particularly to FIG. 4 to FIG. 13 thereof, one embodiment of the present invention will be described.

First of all, the layout of an embodiment of the present invention will be described with reference to FIG. 4 to FIG. 6. The capacitative electrostatic flow meter of the first embodiment of the present invention comprises a detection unit 10 that detects the flow rate of fluid, a signal processing unit 11 that finds a flow rate signal from the detection signal of this detection unit 10 and an exciting circuit 8 that supplies exciting current to an exciting coil in the detection unit 10.

Figure 5:
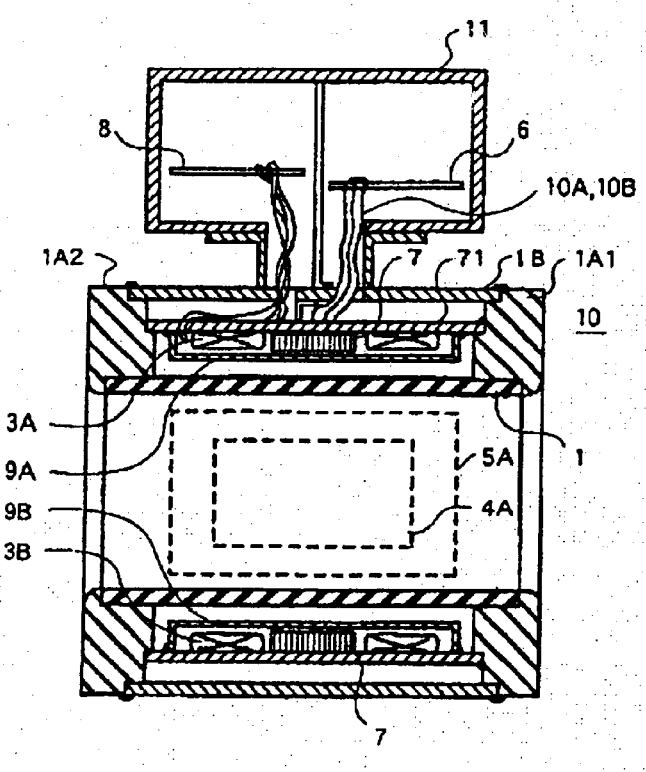
FIG. 5 is a side view of a detection unit according to a first embodiment of present invention.

FIG. 5 is a side cross-sectional view of the detection unit 10. FIG. 6 is a cross-sectional view of the detection unit 10. The exciting circuit 8 and signal processing unit 11 are integrally constituted and accommodated, together with a pre-amplifier 6, in a box on top of the detection unit 10 as shown in FIG. 5 and FIG. 6.

A separated type of device would also be possible, in which these are separately arranged.

In these FIG. 1 is a measurement tube made of insulator such as ceramics. Exciting coils 3A and 3B, wound on a magnetic pole 7, are oppositely arranged at the periphery of the measurement tube 1 and are connected in series.

The exciting coils 3A and 3B are set and arranged such that flux is supplied in the direction orthogonal to the tube axis direction of the measurement tube 1 by means of a cylindrical yoke 71 arranged coaxially with the measurement tube 1 and positioned at the periphery of the exciting coils 3A, 3B.

4A and 4B are face electrodes made of non-magnetic material having high electrical conductivity, such as copper sheet and are oppositely arranged at the periphery of the measurement tube 1, so that the axis joining their centers is arranged so as to intersect orthogonally both the direction of the magnetic field of the exciting flux and the axis of the tube through which the fluid 2 to be measured flows. Also, the guard electrodes 5A, 5B are set fixed in position so as to present an electrostatic capacity below a prescribed value, as will be described, so as to completely cover the respective face electrodes 4A and 4B and with the distance between the face electrodes 4A, 4B and the respective guard electrodes 5A, 5B fixed.

The coil fixing plates 9A, 9B are constructed of metal sheet made of non-magnetic material having a high electrical conductivity, such as copper sheet and completely cover the exciting coils 3A and 3B; they are fixed, electrically connected with the cylindrical yoke 71.

1A1 and 1A2 are earth rings that form flanges provided at both ends of the measurement tube, both ends of a metal pipe 1B and the cylindrical yoke 71 mentioned above being fixed thereto.

In addition, earth terminals E provided on the earth rings 1A1, 1A2 connected with a common earth point C of the circuit are connected, selecting a ground point G at a stable potential.

10A and 10B are signal cables, constituted as double shielded cables constructed by covering a core wire, a shield provided at the periphery of this core wire and a guard shield with insulator. The core wires of these signal cables 10A, 10B are respectively connected with face electrodes 4A, 4B and the shields thereof with the guard electrodes 5A, 5B and the guard shields thereof with the common earth C of the circuit. These signal cables 10A and 10B are fixed maintaining a prescribed distance, by arranging an insulating spacer, not shown, along the periphery of the cylindrical yoke 71, and are connected with the amplifiers 6A, 6B of the pre-amplifier 6 through an electrical conduction passage provided in the metal pipe 1B.

In more detail, these signal cables are connected with the pre-amplifier 6 by running along in the same plane as the direction of the exciting magnetic field described above, being fixed at fixed intervals with insulator interposed along the periphery of the cylindrical yoke 71 described above and intersecting at right angles at the top of the cylindrical yoke 71.

The core wire, shield and guard shield constituting the signal cables 10A, 10B are all made of non-magnetic material of high electrical conductivity, such as copper.

Also, the face electrodes 4A, 4B and guard electrodes 5A, 5B are respectively connected with the non-inverting input, inverting input and output of respective amplifiers 6A, 6B and the difference of the outputs of the respective amplifiers 6A, 6B is amplified by a difference amplifier 6C to provide a detection signal e that is connected with an analogue/digital conversion circuit (hereinbelow termed ADC circuit) 11A of the signal processing unit 11.

The detection signal e is converted to a digital signal in this ADC circuit 11A, the output of which is then sent to a flow rate measurement processing circuit 11B, where it is processed to convert it to a flow rate signal.

In the exciting circuit 8, a square wave signal of 300 Hz is generated by means of a square wave generator 8A and this signal is supplied to a characteristic correction filter 8B. After correction processing of the gain frequency characteristic so as to have a flat section in the exciting flux waveform, as will be later described, in this characteristic correction filter 8B, the output of this characteristic correction filter 8B is applied as an exciting current $i_F$ to the exciting coils 3A, 3B mentioned above through a current control amplifier 8C.

Next, further details of the setting and action of the various units of the capacitative electromagnetic flow meter according to the present invention set up in this way will be described.

Figure 7:
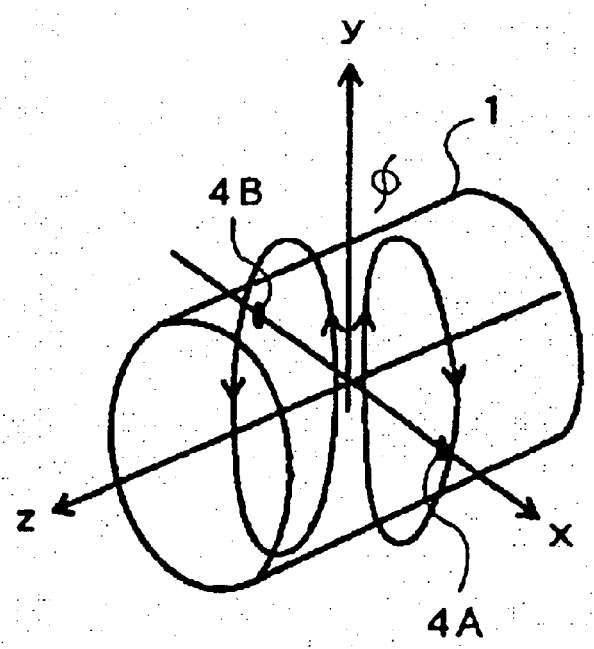
FIG. 7 is a diagram of the principles of the present invention.

First of all, FIG. 7 and FIG. 8 are views given in explanation of the principles of measurement of a capacitative electrostatic flow meter according to the present invention. FIG. 7 is a view given in explanation of the principles of detection and is a model diagram showing how an e.m.f. is generated that is proportional to the flow rate between the face electrodes 4A and 4B, the central axis connecting the face electrodes 4A and 4B of the side face of the measurement tube 1 being designated as the x axis, the axial direction of the exciting flux Φ at right angles to this being designated as the y axis and the axial direction of the tube through which the fluid moves being designated as the z axis.

In order to obtain a stable capacitative electromagnetic flow meter of high accuracy, various anti-noise measures are necessary, as described above. First of all, as such anti-noise measures, as described in the prior art example, measures are required in respect of differentiation noise produced by electromagnetic induction, fluid noise generated in the fluid and induction noise generated by electromagnetic coupling and electrostatic coupling in the detection unit 10 induced into the detection circuit that detects the e.m.f.

In FIG. 7, in order to avoid the effects of differentiation noise and fluid noise, an exciting flux Φ of high frequency having an ideally flat section, to be described in detail later, is applied and the various sections are designed such that accurate separation and extraction of only the flow rate signal component is achieved, by reducing to the utmost the eddy current generating element component of the magnetic flux circuit that disturbs the waveform of the exciting flux Φ, intersecting orthogonally with this exciting magnetic flux Φ, and reducing to the utmost the noise that is induced in the detection loop formed by the detection electrodes constituted by the face electrodes 4A, 4B and the guard electrodes 5A, 5B (hereinbelow referred to as the detection electrodes) and the pre-amplifier 6.

Consequently, in the detection loop formed by the face electrodes 4A, 4B and the pre-amplifier 6, as shown in FIG. 8, the signal cables 10A, 10B are arranged so as to remove noise induced by electromagnetic coupling, by reducing the area S shown hatched and making the flux that intersects with this detection loop as small as possible, by arranging for this to be formed in a plane that is parallel with the exciting flux Φ.

Figure 6:
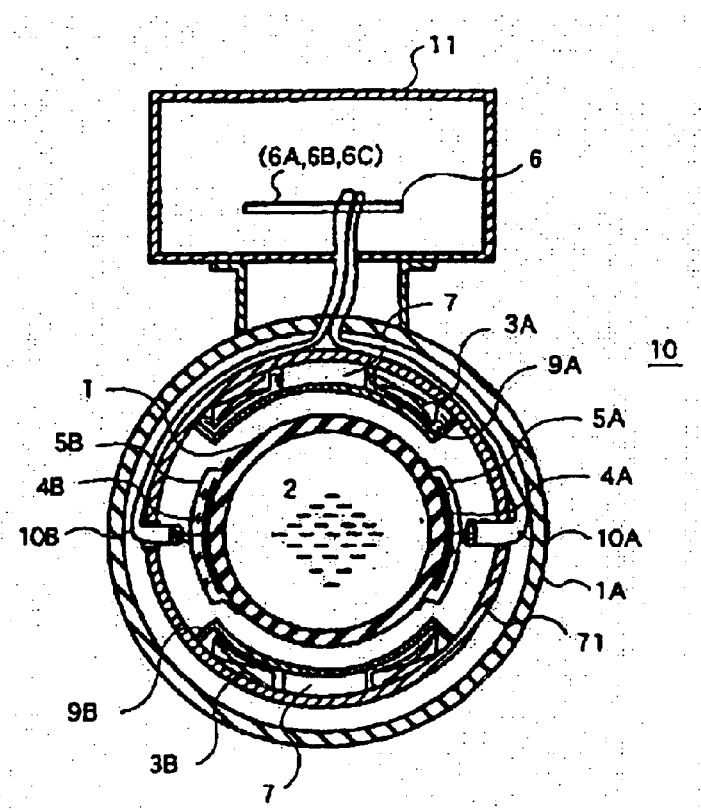
FIG. 6 is a cross-sectional view of the detection unit according to the first embodiment of the present invention.

Also, with a detection unit 10 as shown in FIG. 5 and FIG. 6, noise that is induced in the same phase is removed by the difference amplifier 6C by adopting a construction that is electrically symmetrical with regard to both electrostatic aspects and electromagnetic aspects, so that the face electrodes 4A and 4B are respectively at the same potential with respect to ground G.

Furthermore, since, while the e.m.f. of the fluid is at the millivolt level, the portion represented by the exciting coils 3A, 3B is a high potential level of a few tens of volts, the noise resulting from the induction of the signal from the exciting circuit into the face electrodes 4A and 4B and the guard electrodes 5A, 5B by electrostatic conduction is screened by covering the exciting coils 3A, 3B without a gap by means of the coil fixing plates 9A, 9B constituted of non-magnetic material such as copper and connecting with the ground G through the cylindrical yoke 71 and earth rings 1A1, 1A2.

In this way, a symmetrical construction is achieved such that the noise that is induced in the two face electrodes 4A, 4B and the guard electrodes 5A, 5B is a minimum, of the same phase and same level, and the earth rings 1A1, 1A2 are connected to a stable ground G.

Also, since the metal members in the magnetic flux circuit of the exciting flux Φ, apart from the magnet poles 7 and cylindrical yoke 71 constituting the return magnetic circuit, are made of non-magnetic material of high electrical conductivity such as copper in order to suppress generation of eddy currents, the arrangement is such that flux components produced by eddy currents are as far as possible not generated.

In addition, the various elementary components and members that constitute the detection unit are fixed in such a way that their setting conditions are not changed by vibration or humidity.

The set-up of the various units is in accordance with the above concepts.

The detailed setting and action of the exciting current $i_F$ will now be described with reference to FIG. 9 to FIG. 11 with reference to the detailed setting of the various units based on the above concepts.

At first, the frequency of this exciting current $i_F$ is set to a high frequency that is beneficial for distinguishing from the fluid noise, at which the amount of fluid noise is small. The reasons for this are described with reference to FIG. 11.

Figure 11:
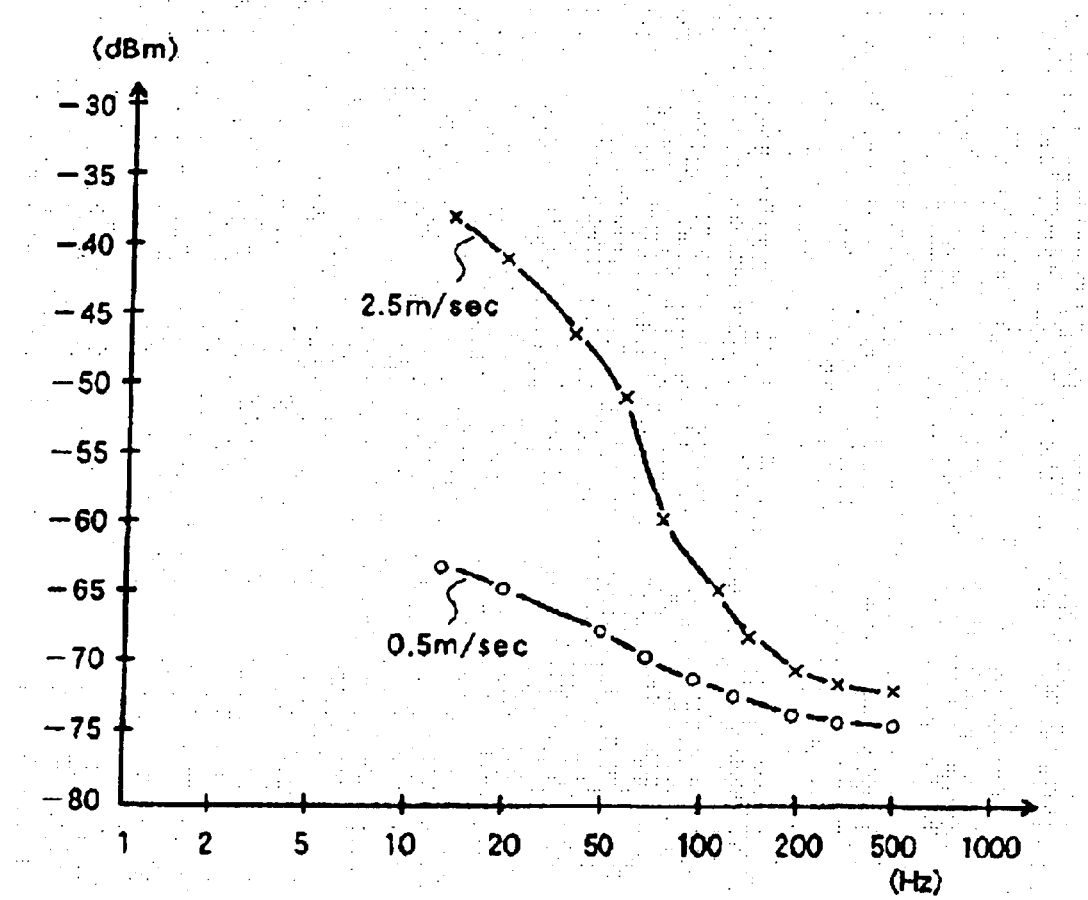
FIG. 11 is a diagram given in explanation of fluid noise.

FIG. 11 shows an example of the measurement results of the fluid noise described above, the frequency being shown along the horizontal axis and the noise power dBm being shown along the vertical axis; the characteristics when the flow rate is 2.5 m/sec and when it is 0.5 m/sec are shown. As shown in this Figure, typically the fluid noise increases when the flow rate of the fluid 2 to be measured increases.

However, irrespective of the flow rate of the fluid 2 to be measured, the frequency tends to be attenuated from about 10 Hz, with the noise power tending to converge to a level of −70 dBm in the vicinity of 200 Hz. The exciting frequency is therefore set by the square wave generator 8A at an oscillation frequency of at least 200 Hz more than the commercially supplied frequency, at which the e.m.f. generated by the flow rate of the fluid 2 to be measured has a high S/N that is unaffected by fluid noise; for example this value may be set at 300 Hz.

Next, the detailed setting of the correction of the waveform of the exciting flux Φ produced by the exciting current $i_F$ will be described with reference to FIG. 9 and FIG. 10. The object of this, as already described, is to achieve an earlier rise of the exciting flux Φ, thereby achieving an earlier rise of the differentiation noise contained in the detection signal e and also the settling time.

As shown in FIG. 9A, typically, the exciting current $i_F$ has a gain frequency characteristic of a first-order delay circuit in which the exciting current $i_F$ is attenuated from the vicinity of the fundamental frequency ($f_0$) of the exciting magnetic field. The exciting flux Φ created by the exciting current $i_F$ therefore also has a waveform tracking this.

Thereupon, as shown in FIG. 9B, this exciting current $i_F$ is supplied through the current control amplifier 8C with a waveform of the exciting current $i_F$ having a differentiation characteristic in which the rising section of the exciting waveform Φ rises steeply, through the characteristic correction filter 8B having a high band pass characteristic, in which the gain frequency characteristic of the exciting circuit including the harmonic components of the fundamental frequency ($f_0$) of the exciting magnetic field is flat.

This characteristic correction filter 8B is a high band filter circuit of a characteristic as shown in FIG. 9B, producing an exciting current $i_F$ waveform having a gain frequency characteristic that is flat up to for example the third harmonic ($f_3$) frequency band having a frequency of three times the fundamental frequency ($f_0$) of the exciting magnetic field.

Furthermore, if correction of higher order harmonics, for example the fifth harmonic ($f_5$) component is necessary, the characteristic correction filter 8B is set to a gain frequency characteristic that is flat up to the higher order frequency region.

Figure 10:
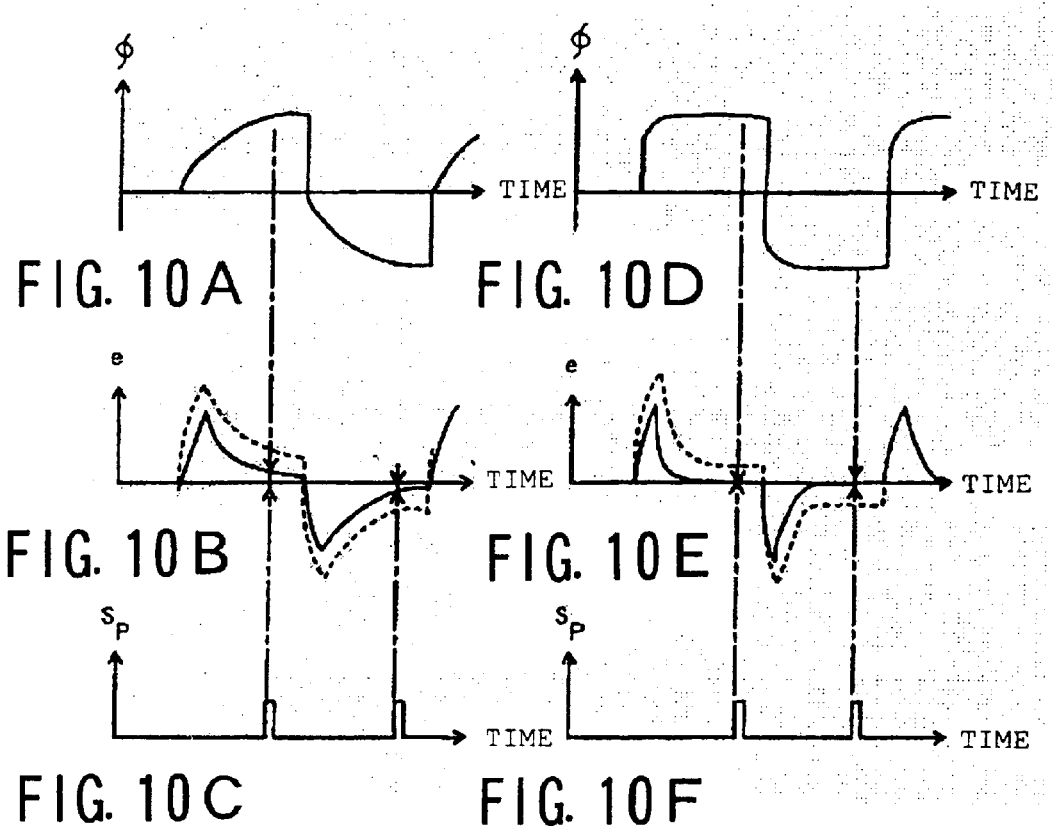
FIG. 10A, FIG. 10B, FIG. 10C, FIG. 10D, FIG. 10E and FIG. 10F are diagrams of the action of an exciting circuit according to the first embodiment of the present invention.

FIG. 10 is a view given in explanation of the action and effect of the exciting current and the exciting flux waveform when this correction filter 8B is employed. FIG. 10A, FIG. 10B and FIG. 10C show the prior art case, when no characteristic correction filter 8A is employed; FIG. 10D, FIG. 10E and FIG. 10F show the case where the characteristic correction filter 8B is employed.

In this Figure, FIG. 10A and FIG. 10B show the exciting flux Φ, FIG. 10B and FIG. 10E show the detection signal e and FIG. 10C and FIG. 10F show the sampling signal $S_P$ of the detection signal e. The continuous line in FIG. 10B and FIG. 10E shows the case where the fluid 2 to be measured is stationary and the broken line shows the waveform of the detection signal e when the fluid 2 to be measured is flowing.

As shown in these Figures, the rise of the exciting flux Φ is blunted as shown in FIG. 10A but the rise is hastened as shown in FIG. 10D by shaping of the exciting current waveform by the characteristic correction filter 8B.

As a result, the differentiation noise contained in the detection signal e shown in this FIG. 10B is improved such that convergence takes place in a short-time as shown in this FIG. 10E. Consequently, with the timing of the sampling signal $S_P$, stable, highly accurate flow rate measurement can be achieved, since only the flow rate component that is unaffected by the differentiation noise can be extracted.

In regard to the characteristic of this characteristic correction filter 8B, an optimum response characteristic of the exciting circuit can be selected by observing the output waveform of the exciting flux Φ or the waveform of the detection signal e.

Figure 12:
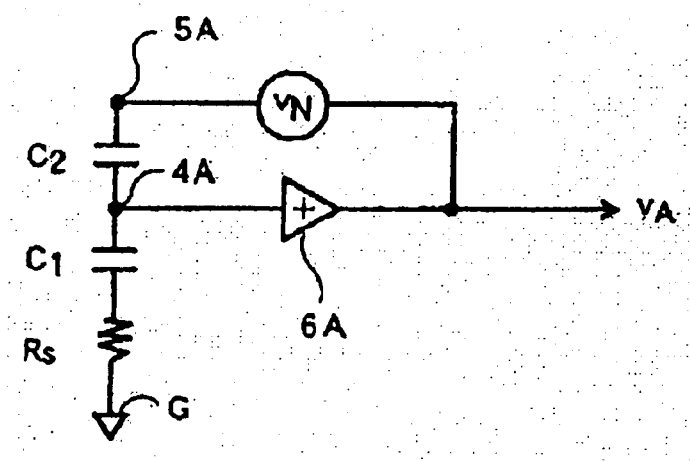
FIG. 12 is a model diagram of a detection circuit between the face electrodes and guard electrodes according to the first embodiment of the present invention.

Next, the details of the setting of the electrostatic capacitance between the face electrodes 4A, 4B and the guard electrodes 5A, 5B will be described, using FIG. 12, by means of a model diagram of the detection circuit of one of the face electrodes 4A and amplifier 6A.

C1 is the electrostatic capacitance formed between the face electrodes 4A and the fluid 2 to be measured i.e. by the material of the measurement tube 1; one side of this is connected with the electrostatic capacitance C2 between the face electrodes 4A and the guard electrode 5A while the other side thereof is connected with the ground potential G through the fluid resistance Rs of the fluid 2 to be measured.

In addition, the connection point of the electrostatic capacitances C1 and C2 is connected with the input of the amplifier 6A and the output thereof is connected with the other one of the terminals of the electrostatic capacitance C2.

If the input impedance of the amplifier 6A is sufficiently high, the noise $v_N$ that is superimposed on the guard electrode 5A and the output $v_A$ of the amplifier 6A are:

$$v_A = (1 + j\omega C1 Rs) \cdot C2/C1 \cdot v_N.$$

Consequently, if the electrostatic capacitance C2 between the face electrode 4A and the guard electrode 5A is larger than the electrostatic capacitance C1 between the face electrodes 4A and the fluid 2 to be measured, the noise that is superimposed on the guard electrode 5A is amplified.

Consequently, if for example the measurement tube 1 is made of ceramics, plastics or the like, which has a smaller dielectric constant than ceramics, is inserted between the face electrode 4A and the guard electrode 5A and, in addition, the separation between the face electrode 4A and the guard electrode 5A is set to be larger than the thickness of the measurement tube 1.

If the dielectric constant of this ceramics is taken as 9 and the dielectric constant of the plastics is taken as 3, even if the separation between the face electrode 4A and the guard electrode 5A is the same as that of the measurement tube 1, the noise that is induced in the guard electrode 5A or the noise that is generated in the amplifier 6A will be reduced to one third.

Apart from the electrical noise generating factors described above, noise is generated by heat or vibration of the detection unit 10 as a whole. An example of countermeasures in this respect is again described with reference to the constructional diagrams of FIG. 5 and FIG. 6 described above.

When there is an abrupt change in the temperature of the fluid of the measurement tube 1, the adhesive or supporting members for mounting of the face electrodes 4A, 4B and guard electrodes 5A, 5B undergoes elongation/compression force due to the difference in thermal expansion coefficient, so these are formed of copper sheet or the like having a high electrical conductivity and are fixed, arranged in a construction capable of withstanding deformation due to thermal distortion, with plastics or the like, by packing with epoxy resin or the like, maintaining a prescribed separation, as described above.

Also, these face electrodes 4A, 4B are arranged to suppress as far as possible generation of flux components in the y axis direction referred to above, by being made of a shape to prevent generation of eddy currents, by inserting slits as shown in FIG. 13 and in particular FIG. 13B.

Also, the signal cables 10A, 10B referred to above are fixed by adhesive, maintaining a fixed separation, with an insulator such as epoxy resin interposed, at the periphery of the cylindrical yoke 7. Non-magnetic material of high electrical conductivity, such as copper, is employed for all of the core wires, shields and guard shields so that no vibration is produced even if the exciting magnetic field Φ fluctuates periodically, and so as to make it possible to prevent friction noise, which might be generated by friction with the insulators interposed respectively between these.

Second Embodiment

The aspect in which the second embodiment differs from the first embodiment is that, in order to produce a construction of even higher reliability than the construction of the detection unit 10 described in the first embodiment, the entire high impedance section from the face electrodes 4A, 4B up to the difference amplifier 6 is fixed in a compact fashion by packing with insulating material having strong insulating characteristics, in order to improve resistance to vibration and insulation of the detection unit 10 as a whole.

A construction is therefore achieved in which generation of electromagnetic induction noise induced by change of input impedance of the two inputs of the difference amplifier 6 and friction noise due to friction of the conductors of the signal cables 10A, 10B and the insulator can be prevented.

Figure 15:
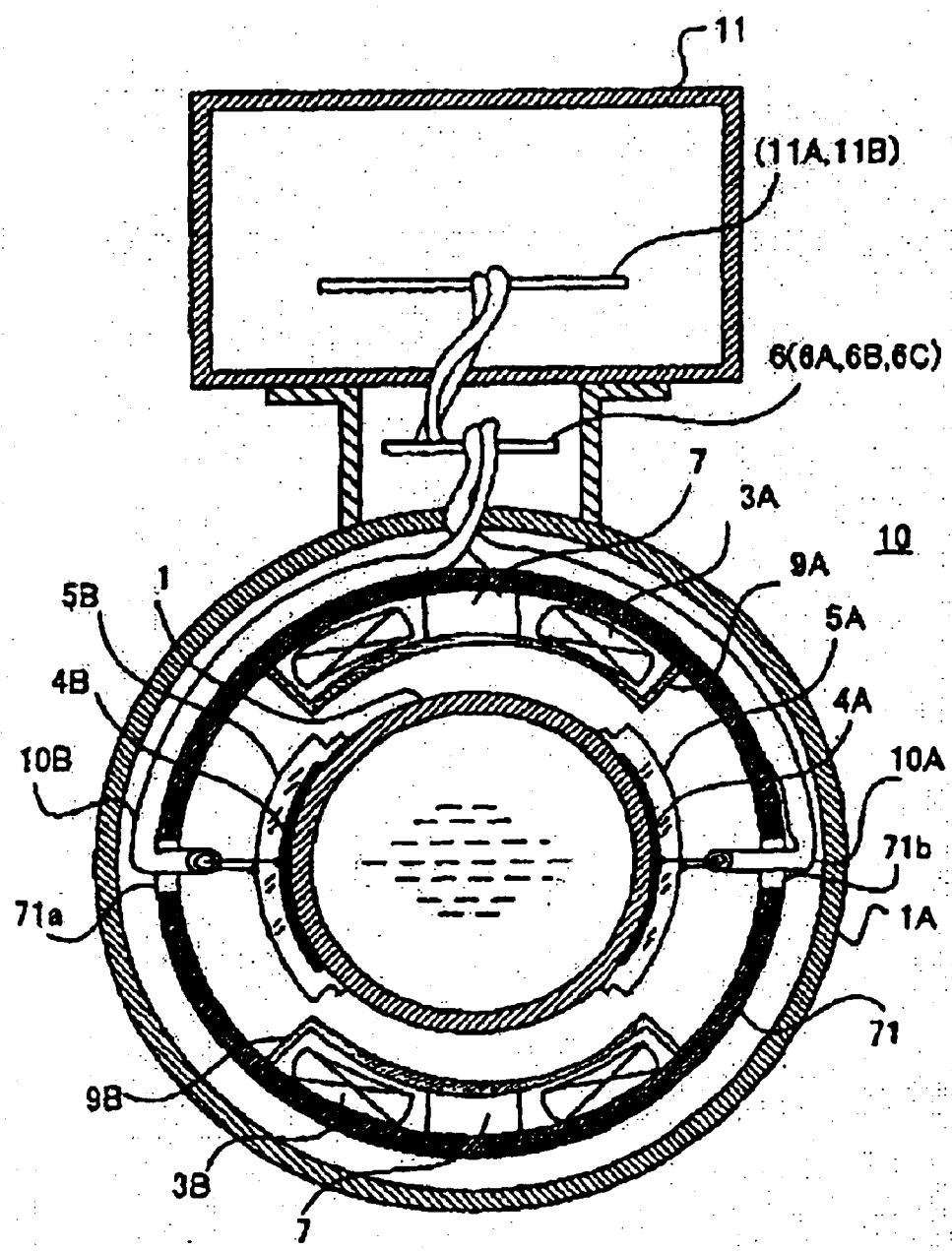
FIG. 15 is a cross-sectional view of the detection unit according to the second embodiment of the present invention.

Hereinbelow, items in the capacitative electromagnetic flow meter according to the second embodiment of the present invention that are the same as in the case of the first embodiment are given the same reference numerals and further description thereof is omitted. A second embodiment of the present invention is described below with reference to FIG. 14, FIG. 15, FIG. 16 and FIG. 4. FIG. 14 is a side cross-sectional view of the detection unit 10 and FIG. 15 is a cross-sectional view of the detection unit. Also, FIG. 16 is a view given in explanation of the construction of the face electrode 4A and guard electrode 5A.

First of all, the names and functions of various items are the same as in the case of the first embodiment, so the description will be suitably abbreviated by describing only the differences thereof with respect to the first embodiment. In the head section 21 where the detection unit 10 and signal processing unit 11 are coupled, the pre-amplifier 6 that amplifies the signal from the detection electrodes is installed separately from the ADC circuit 11A and the flow rate measurement circuit 11B of the signal processing unit 11 of the downstream stage.

The signal processing unit 11 may be arranged within a box at the top of the detection unit 10 as described in the first embodiment or in a separate casing separated therefrom.

Figures 16A, 16B:
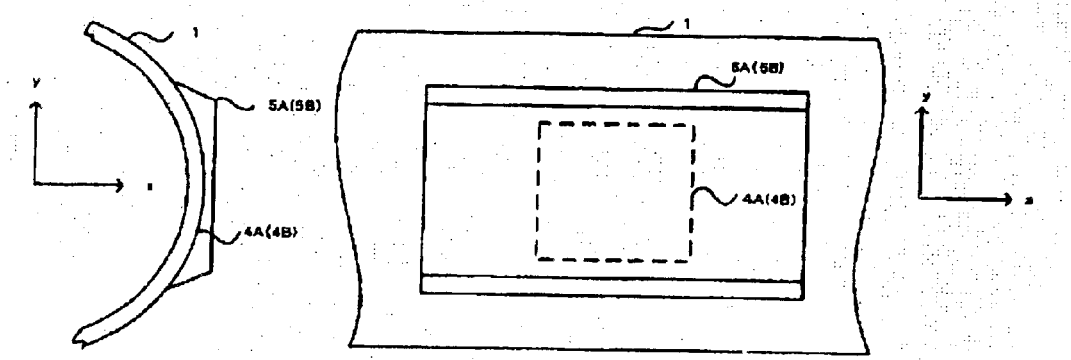
FIG. 16A and FIG. 16B are layout diagrams of face electrodes and guard electrodes according to the present invention.

Next, the construction of the detection electrodes will be described with reference to FIG. 16A and FIG. 16B. FIG. 16A is a cross-sectional view of one of the face electrodes 4A and guard electrode 5A; FIG. 16B is a side view seen from the outside direction of the electrode axis x joining the face electrodes 4A and 4B. A metal plate of high electrical conductivity, for example face electrode 4A made of copper sheet or the like, is sintered to the outside wall of the measurement tube 1 made of ceramics or the like.

In addition, a guard electrode 5A of a shape extending further than the electrode dimension in the z axis direction in which the fluid 2 to be measured moves is arranged so as to cover this face electrode 4A (the y axis direction indicates the direction of application of the exciting flux).

This guard electrode 5A is molded of metal sheet of high electrical conductivity, like the face electrode 4A, and constitutes a cavity in the direction of the tube axis, of a downwardly diverging shape seen from the direction of the xy cross section of FIG. 16A. As shown in FIG. 16B, this guard electrode 5A covers the face electrode 4A and is arranged so as to ensure a prescribed gap with respect to the face electrode 4A. As described in the first embodiment, the electrostatic capacitance between the detection electrodes is arranged to be smaller than the electrostatic capacitance between the face electrode 4A and the fluid 2 to be measured.

The size of this guard electrode 5A does not need to be sufficiently large to cover all of the periphery of the measurement tube, which it divides into two together with the other guard electrode 5B but need only be sufficiently large to enable the prescribed e.m.f. to be extracted. Usually, as shown in FIG. 16A and FIG. 16B, the extension of this guard electrode 5A in the circumferential direction of the measurement tube 1 is sufficient if it is about 60° and the dimension of this guard electrode 5A in the tube axis direction z through which the fluid 2 to be measured flows is sufficient if it is about 60% of the length of the measurement tube 1.

These guard electrodes 5A, 5B are fixed to the measurement tube 1 by adhesive glass tape.

Also, as in the first embodiment, the shape of the face electrode 4A may be a shape in which slits are inserted so as to decrease generation of eddy currents.

One of the core wires of the signal cables 10A, 10B is connected with the face electrodes 4A, 4B while the shield thereof is connected with the guard electrodes 5A, 5B, respectively, the other thereof being connected with the pre-amplifier 6. The guard shield is earthed by being connected with the common potential C of this pre-amplifier 6 shown in FIG. 4.

Next, the method of packing the detection unit 10 and pre-amplifier 6 with epoxy resin will be described. In the cylindrical yoke 71 of the detection unit 10 in a condition assembled as in FIG. 14 and FIG. 15, apart from the holes 71a, 71b, through which the signal cables 10A, 10B are passed, that are provided in the vicinity of the tube wall of the measurement tube 1 where the tube axis of the measurement tube 1 and the axis connecting the centers of the pair of electrodes intersect, there are provided, separately or in common, a hole 71c through which the exciting signal whereby the exciting current is applied to the exciting coils 3A, 3B from the exciting circuit 8 cable is passed and a hole 71d for introduction of the epoxy resin that is sealed therein and for escape of air during this process, in locations other than those of the holes 71a, 71b, so as not to disturb the exciting flux.

Epoxy resin mixed with a prescribed curing agent is then slowly poured in from a prescribed resin introduction pipe socket from the head 21 of the signal processing unit 11, while shaking and tilting the detection unit 10 to left and right and forwards and backwards and while allowing the air in the interior thereof to escape, so as to cover the pre-amplifier 6 of the head 21.

With this construction, the face electrodes 4A, 4B and the guard electrodes 5A, 5B are fixed within the measurement tube 1 in a compact arrangement having a prescribed mechanical strength and fixing can be achieved solely by means of the epoxy resin filling.

Also, depending on the application, by pouring in epoxy resin as far as the signal processing unit 11 at the rear section arranged at the top of the head 21, insulating of this portion also can be ensured.

In this way, epoxy resin is poured into the entire space within the detection unit 10 enclosed by the measurement tube 1, metal pipe 1B and earth rings 1A1 and 1A2. In addition, fixing with epoxy resin is achieved as far as the head 21 of the detection unit 10.

With this second embodiment of the present invention, electromagnetic induction noise and friction noise produced by vibration of the signal cables 10A, 10B that connect these detection electrodes and the difference amplifier 6 can be prevented, since the high impedance section is laid in a compact fashion over the minimum distance from the detection electrodes to the difference amplifier 6 and is fixed by epoxy resin. Furthermore, deterioration of insulation is reduced by fixing the high impedance section with resin.

Also, since the detection electrodes 4A, 4B are sintered to the measurement tube 1 and the guard electrodes 5A, 5B compact and are made of a thickness capable of withstanding prescribed stress, there is no risk of failure even on occurrence of thermal contraction due to temperature change of the fluid 2 to be measured or on curing of the epoxy resin. Furthermore, since the pre-amplifier 6 is arranged at the head 21 of the detection unit 10, a heat-screening construction can be achieved, making it possible to use the flow meter even when the fluid 2 to be measured is at high temperature.

Third Embodiment

The difference of the third embodiment from the first embodiment is that both ends in the tube axis direction intersecting with the central axial plane of the flux of the coil fixing plates 9A, 9B and cylindrical yoke 71 that form the magnetic return circuit are cut away in prescribed shapes in order to suppress generation of eddy currents, so that differentiation noise components contained in the detection signal can be reduced by more rapid rise of the exciting current and a high exciting frequency range of more than 200 Hz can be set, at which the fluid noise is less than a prescribed range.

Also, in order to cut off electrostatic coupling produced by the cutting away of the coil fixing plates 9A, 9B and the cylindrical yoke 71, lugs are provided on the guard electrodes 5A, 5B to strengthen the electrostatic shielding effect of the guard electrodes 5A, 5B in the tube axis direction and a configuration is adopted having only a small gap.

Furthermore, by applying a coating of silicone resin to the surface of the face electrodes 4A, 4B and guard electrodes 5A, 5B before filling with epoxy resin and curing, stress produced by heat absorption by the epoxy resin is absorbed by the coating material, making it possible to prevent production of cracks between the face electrodes 4A, 4B and guard electrodes 5A, 5B and the epoxy resin.

Figure 4:
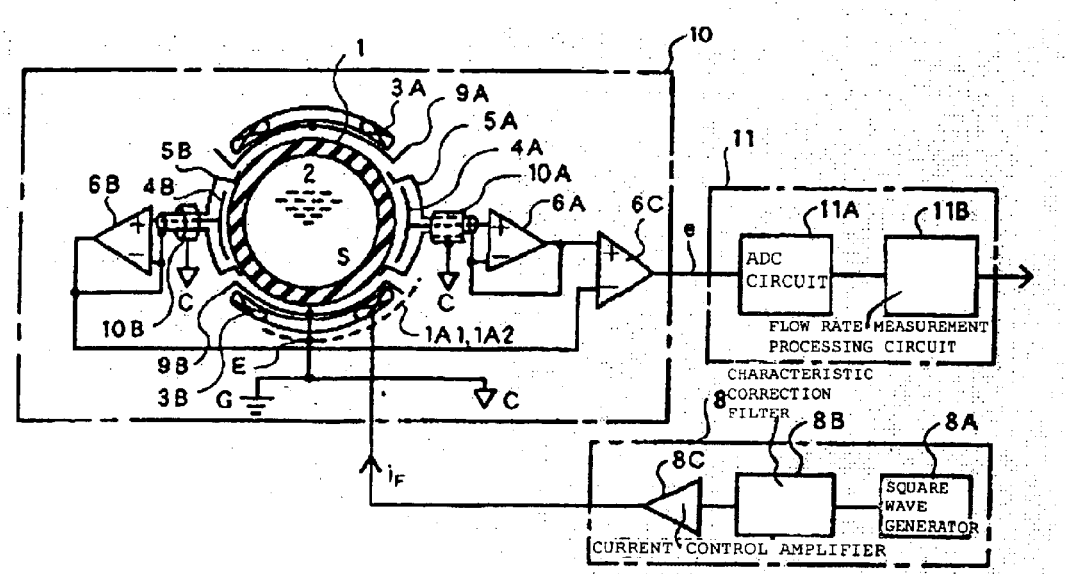
FIG. 4 is a layout diagram showing an embodiment of the present invention.

Hereinbelow, regarding the capacitive electrostatic flow meter according to the third embodiment of the present invention, items that are the same as items in the first embodiment shown in FIG. 4 to FIG. 6 are indicated with the same reference symbols and further description thereof is omitted.

Figure 17A:
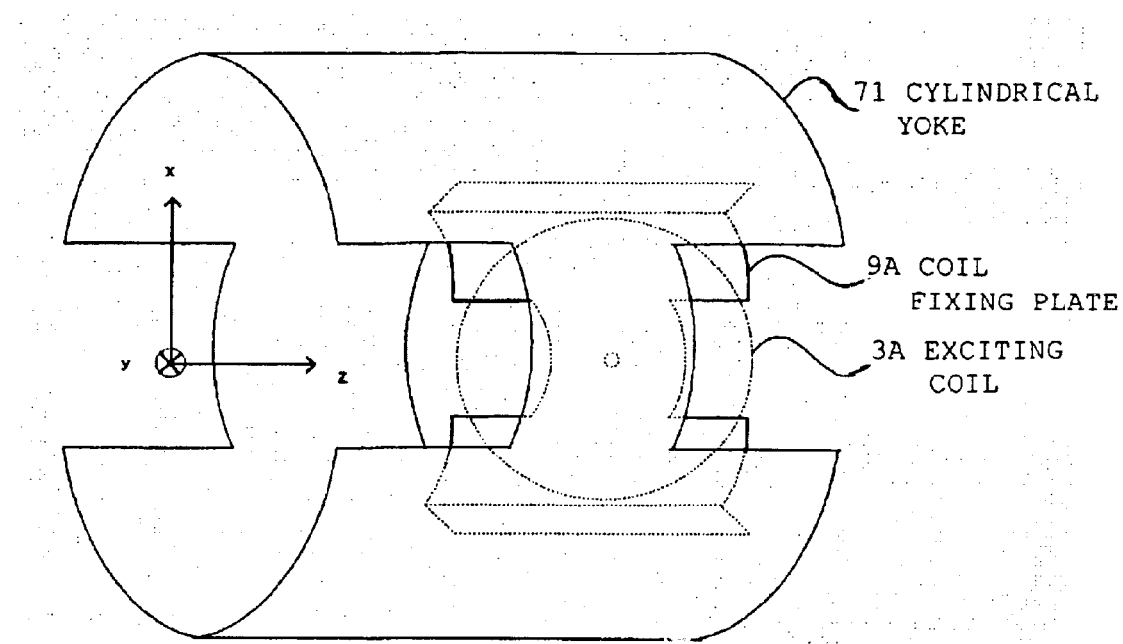
FIG. 17A and FIG. 17B are diagrams showing the construction of a return magnetic circuit according to a third embodiment of the present invention.

FIG. 17 is a view showing how the cylindrical yoke 71 and the end of one of the coil fixing plates 9A that form the magnetic return circuit are cut away in order to reduce eddy currents and FIG. 17A is a perspective view seen from above the side-face in the direction of the central axis of the flux (hereinbelow called the y axis).

Figure 17B:
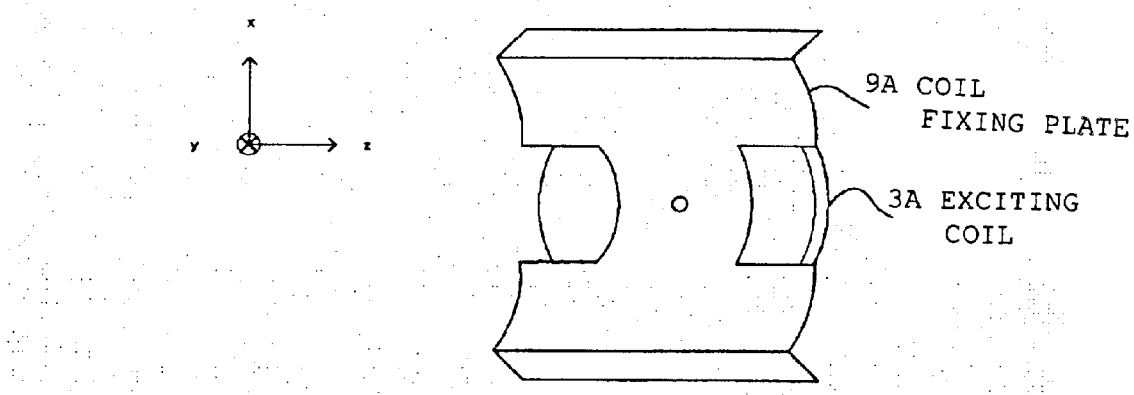

In these Figures, one exciting coil 3A is fixed by means of a screw or the like, not shown, to the cylindrical yoke 71 by the coil fixing plate 9A shown in FIG. 17B. The coil fixing plate 9A that contacts the exciting coil 3A, and part of the end of the cylindrical yoke 71, are cut away in a prescribed shape, whose details will be described later, along the direction of the tube axis of the measurement tube 1 (hereinbelow called the z axis). The other coil fixing plate 9B and cylindrical yoke 71 on the other side are given an identical cutaway shape in a symmetrical position.

Figure 18A:
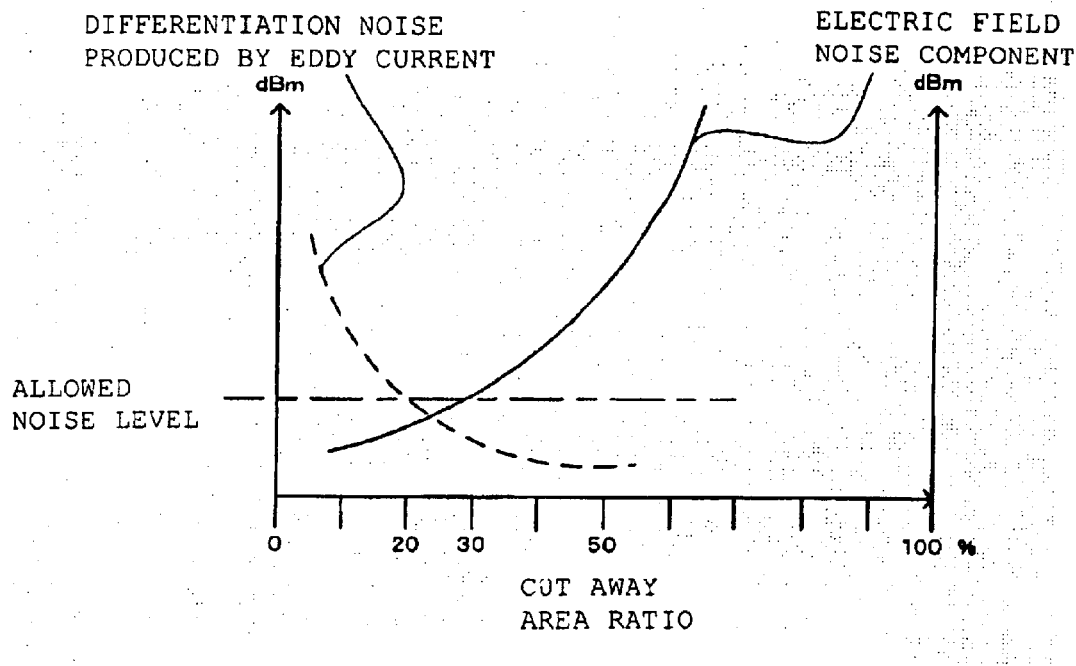
FIG. 18A and FIG. 18B are diagrams of a method of setting up a return magnetic circuit according to the third embodiment of the present invention.
Figure 18B:
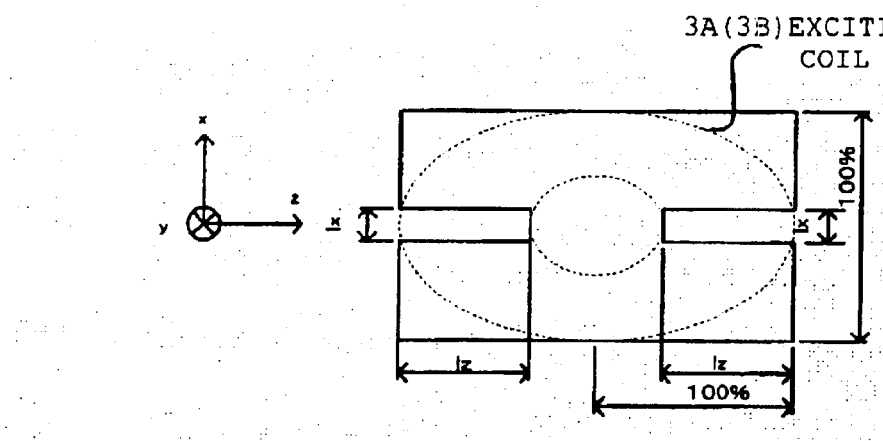

Although the magnetic pole 7 is not shown in FIG. 18B, the exciting means constituted by the exciting coils 3A, 3B and magnetic pole 7 may provide a prescribed exciting flux intensity and may alternatively be constituted solely by the exciting coils 3A, 3B.

Next, the method of defining the cutaway (or cut-out) shape will be described with reference to FIG. 18A and FIG. 18B. FIG. 18A shows in qualitative fashion the relationship of the area of the cutaway portions and the decreasing effect of differentiation noise produced by eddy currents superimposed on the detection signal, and the increase in magnetic field noise produced by electrostatic coupling of the exciting power source of the exciting coils 3A, 3B with the face electrodes 4A, 4B and the guard electrodes 5A, 5B (hereinbelow termed electrical field noise).

As shown in these Figures, regarding the area of the cutaway portions, there is a trade-off relationship (antinomy) between the decrease of differentiation noise produced by eddy currents and increase of electric field noise produced by electrostatic induction, so the area must be set in a range such that both effects are less than the prescribed allowed values.

For example, according to prescribed model tests, as shown in these Figures, if this cutaway area is made to be a cutaway area of 20% to 30% of the projection area of the coil fixing plates 9A, 9B that contact the exciting coil 3A and cylindrical yoke 71 in the y axis direction, the noise can be kept below the prescribed allowed noise level.

Various modifications of this cutaway shape are possible. FIG. 18B is a view showing the cutting away of the coil fixing plate 9A and cylindrical yoke 71 projected onto the xz axis plane. As shown in this Figure, since the eddy currents that form the diamagnetic field in the y axis direction can be cut off by cutting away a prescribed limiting dimension lx in the direction of the axis that joins the pair of electrode axes (hereinbelow called the x axis), effective adjustment of the optimum cutaway dimension of (lx×lz) can be achieved by increasing the lz dimension in the z axis direction, in a range such that electric field noise is not increased.

As a result of such adjustment of the eddy currents, an early rise of the exciting flux Φ can be achieved, so an exciting frequency can be set at which the frequency component of fluid noise can easily be separated.

The benefits obtained by the third embodiment when set up as follows will now be described.

Figure 19A:
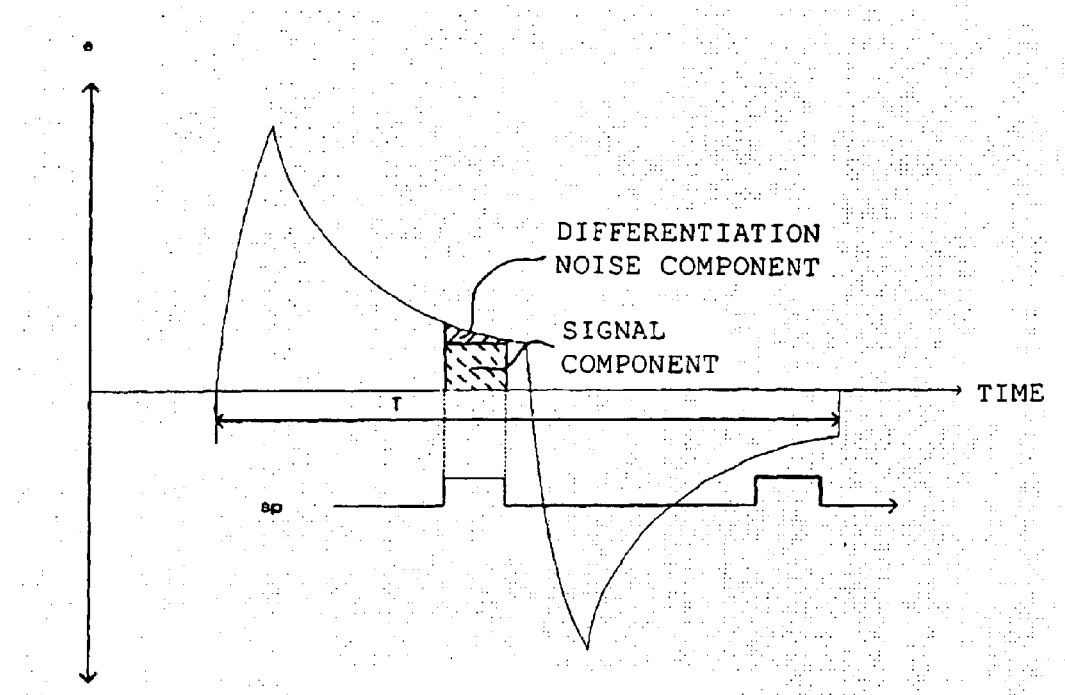
FIG. 19A and FIG. 19B are diagrams of the beneficial action of the third embodiment of the present invention.

As shown in FIG. 19A, if, for example, the exciting frequency is set at 100 Hz (T=10 msec) and the detection signal e is sampled with a sampling pulse Sp, as the signal component becomes larger, fluctuations of the differentiation noise can be neglected but, as shown by the broken line, if the exciting frequency is set at 200 Hz (T/2=5 msec), the ratio of the differentiation noise that is sampled with respect to the detection signal e of FIG. 18B becomes large, with the result that its effect on measurement accuracy becomes large and cannot be neglected.

Figure 19B:
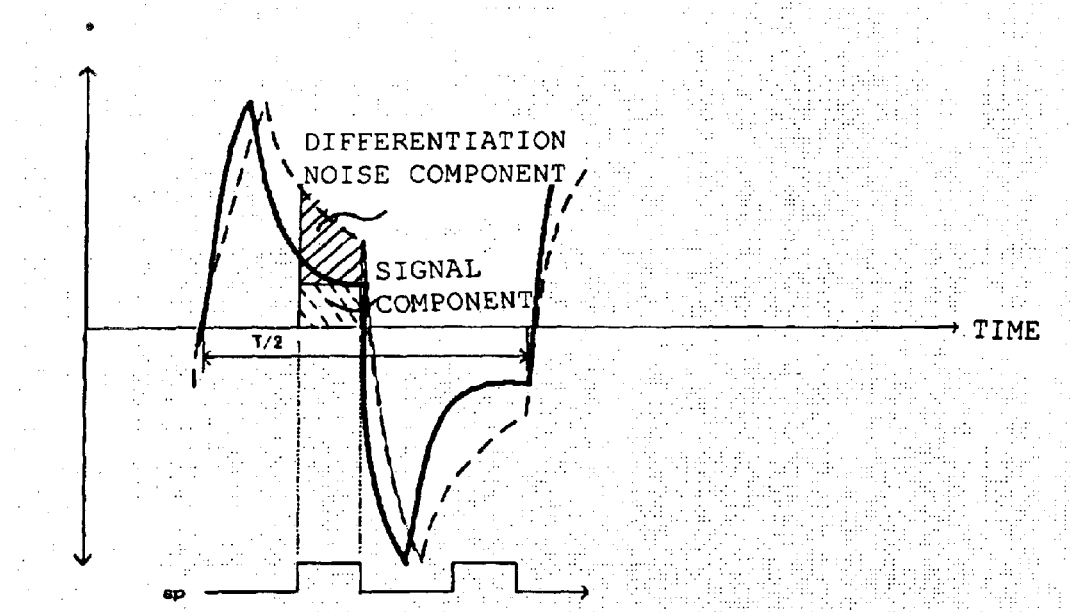

In this respect, if the eddy currents are reduced by means of the cutaway portions described above as described in this embodiment, the rise of the exciting flux Φ occurs earlier, so, even at an exciting frequency of 200 Hz, the ratio of differentiation noise of the detection signal e of FIG. 19B is decreased, as shown by the continuous line.

Figure 20:
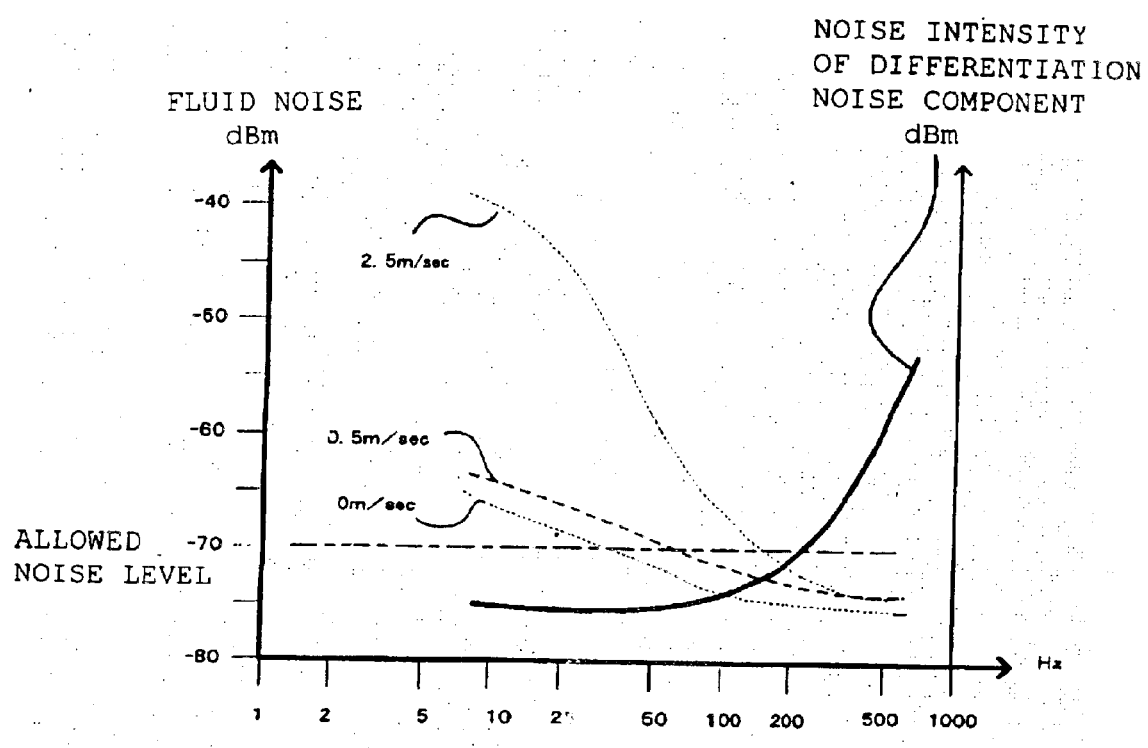
FIG. 20 is a diagram of the setting of the exciting frequency of the third embodiment of the present invention.

As a result, even though, with regard to the exciting frequency, lowering of the fluid noise and increase of differentiation noise are in a trade-off relationship, it becomes possible to select a frequency, specifically a frequency in the vicinity of 200 Hz and over, in a range of exciting frequency at which both of these are below the prescribed noise levels, as shown in FIG. 20.

Figure 21A:
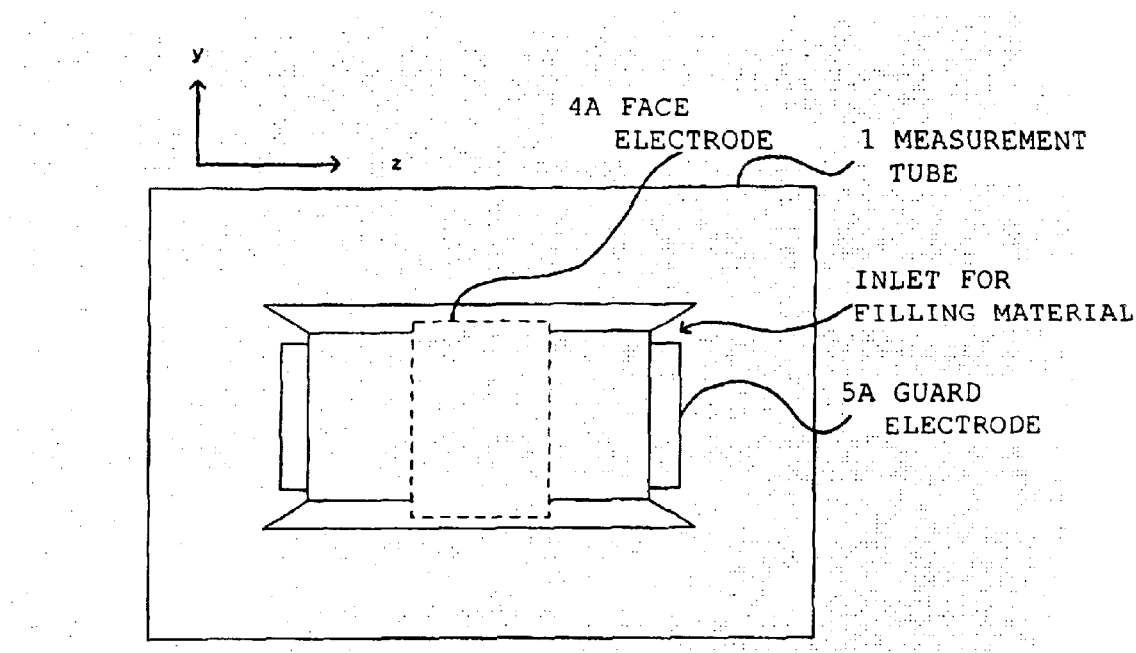
FIG. 21A, FIG. 21B and FIG. 21C are constructional views of the face electrodes and guard electrodes.
Figures 21B, 21C:
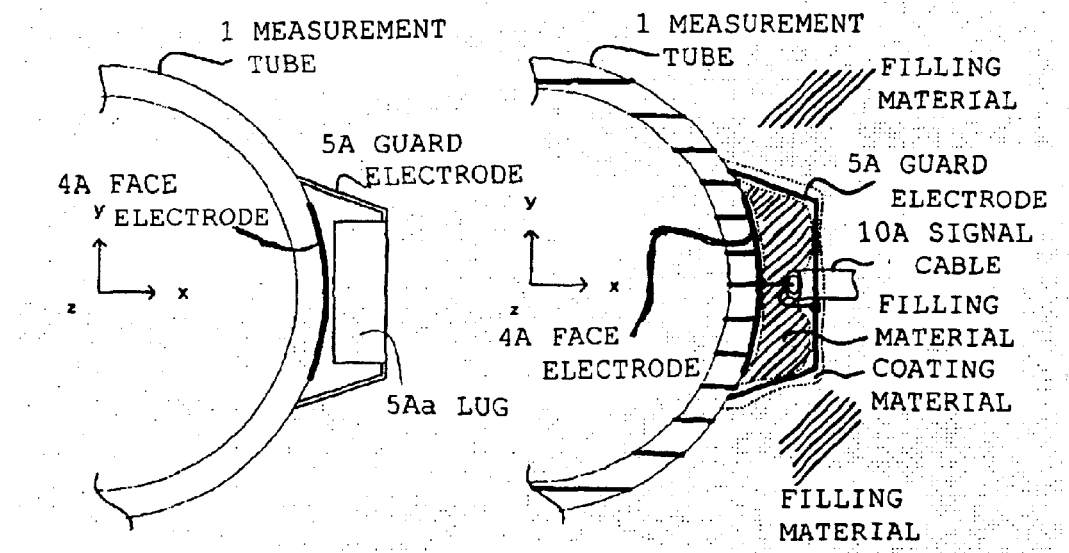

Next, the shield structure of the guard electrode 5A (5B) will be described with reference to FIG. 21A and FIG. 21B. FIG. 21A and FIG. 21B are respectively a perspective view given in explanation of the construction of the region of the guard electrode 5A seen from the x axis direction of one side face of the measurement tube 1 and a cross-sectional view of the guard electrode region seen from the z axis direction of the measurement tube 1.

As shown in FIG. 21B, a lug 5Aa is provided at both ends in the said axis direction of the measurement tube 1 of the guard electrode 5A, so as to produce a shape in which the gap is a small as possible while maintaining sufficient space for introduction of the epoxy resin to be achieved.

In the third embodiment, the coil fixing plates 9A, 9B and both ends of the cylindrical yoke 1 that constitute the magnetic return circuit are cut away, so the risk of increased electrical field noise due to electrostatic capacitative coupling of the exciting coils 3A, 3B and the guard electrode 5A is increased but electrostatic coupling can be reduced by shielding by providing lugs at both ends of the guard electrodes 5A, 5B.

Also, as shown in FIG. 21C, on the surface of the face electrode 4A (4B) and guard electrode 5A (5B), silicone resin or soft rubber such as chloroprene rubber is applied in the other portions prior to the introduction of the epoxy resin, in the high impedance portion between the face electrode 4A (4B) and guard electrode 5A (5B) and the lead of the signal cable, such that the insulation is not lowered by this soft rubber. Filling with epoxy resin of high insulating properties is performed after this soft rubber has dried.

By coating the surfaces of the face electrodes 4A, 4B and guard electrodes 5A, 5B in this way with silicone resin or the like, stress produced on thermal contraction of the epoxy resin and due to differences in the thermal expansion/contraction between the epoxy resin and the face electrodes 4A, 4B and guard electrodes 5A, 5B can be absorbed by means of this applied silicone resin, so cracking or loosening can be prevented.

As described above, with the present invention, by simplifying the construction of the exciting magnetic circuit, the rise of the exciting flux can be made to occur earlier, so an exciting frequency can be employed at which the effect of fluid noise can be reduced. Also, a symmetrical shape construction is adopted in respect of the paired face electrodes and guard electrodes and detection circuit in which difference amplification is performed and a shield construction whereby a high ratio of removal of in-phase noise can be achieved electrically is employed, such that the flow rate signal obtained by difference amplification from the paired face electrodes and guard electrodes can be detected with high S/N ratio.

Furthermore, according to the present invention, a structure is produced which is of high strength capable of withstanding even the stress produced by thermal expansion/contraction, by filling the interior of this detection unit with insulator, thereby making it possible to provide a capacitative electromagnetic flow meter of highly reliability that is resistant to the effects of induction noise or friction noise produced by vibration.

Also, according to the present invention, by making the electrostatic capacitance of the face electrodes and guard electrodes smaller than the electrostatic capacitance between the face electrodes and the fluid to be measured, the amplification gain of the induction noise and the amplifier noise is suppressed, so a stable capacitative electromagnetic flow meter of high accuracy can be provided.

Also, according to the present invention, generation of eddy currents can be prevented, so the risk of disturbing the magnetic flux circuit is small. Also, thanks to the provision of prescribed mechanical strength, a capacitative electromagnetic flow meter can be achieved which is resistant to thermal deformation.

Also, according to present invention, the area of intersection with the detection loop can be made small and the electromagnetic induction noise can be reduced. Also, since the cable between the detection electrodes and the pre-amplifier is non-magnetic and fixed, a capacitative electromagnetic flow meter can be obtained in which there is little generation of vibration noise of the cable produced by vibrations of the fluid or noise due to electromagnetic induction.

Also, according to present invention, a capacitative electromagnetic flow meter can be produced in which there is no noise generation due to vibration of the fluid and no noise generation due to vibration of the exciting coils.

Also, since, according to the present invention, the length of the signal cable is made a minimum, the difference amplifier is accommodated compactly in the head and the entire high-impedance portion from the aforementioned face electrodes and guard electrodes to the aforementioned pre-amplifier is fixed, generation of noise due to vibration can be kept to a minimum and a capacitative electromagnetic flow meter can be provided of excellent resistance to humidity.

Also, since, according to the present invention, the coil fixing plates and cylindrical yoke are cut away in a prescribed shape, suppressing generation of eddy currents and enabling a higher exciting frequency to be employed due to earlier rise of the exciting flux, a capacitative electromagnetic flow meter can be obtained that is little affected by fluid noise.

Also, according to the present invention, since silicone resin or soft rubber is applied between the face electrodes and guard electrodes and epoxy resin, the stress generated when thermal contraction of the epoxy resin occurs is absorbed by the soft rubber, so a construction can be achieved in which no cracks are generated between the face electrodes, guard electrodes and epoxy resin.

Obviously, numerous additional modifications and variations of the present invention are possible in light of the above teachings. It is therefore to be understood that within the scope of the appended claims, the present invention may be practised otherwise than as specially described herein.

What is claimed is:

1. A capacitative electromagnetic flow meter comprising:
   a measurement tube made of insulating material through which flows a fluid to be measured;
   an exciting coil wound on a magnetic pole arranged facing a periphery of said measurement tube, that supplies flux in a direction orthogonal to a tube axis direction of said measurement tube;
   a pair of face electrodes arranged facing a periphery of an outer wall of said measurement tube in directions respectively orthogonal to a direction of said flux and said tube axis direction of said measurement tube;
   guard electrodes arranged so as to cover said face electrodes from said periphery of said outer wall, maintaining a prescribed separation with said face electrodes;
   an exciting circuit that supplies an exciting current of a frequency of at least a commercially available frequency to said exciting coil;
   a pre-amplifier that amplifies a detection signal detected through an electrostatic capacitances between said fluid to be measured and said pair of face electrodes, respectively, and between said face electrodes and said guard electrodes;
   a cable whereby said face electrodes and guard electrodes are connected with said pre-amplifier;
   a signal processing unit that outputs a flow rate of said fluid to be measured from an output signal of said pre-amplifier;

a cylindrical yoke forming a magnetic return circuit of an exciting magnetic field arranged coaxially with said measurement tube and so as to cover a periphery of said exciting coil;

a coil fixing plate of non-magnetic material electrically configured and fixed to said cylindrical yoke, covering said exciting coil; and an earth ring provided at both ends of said measurement tube, whereby a metal pipe that is coaxially arranged with said cylindrical yoke and said cylindrical yoke are configured and fixed symmetrically and electrically connected with respect to an axis connecting centers of said pair of face electrodes and a tube axis of said measurement tube, at a periphery of said cylindrical yoke, wherein said exciting circuit comprises filter means that controls a waveform of said exciting current such that an exciting flux waveform has a flat section; and a value of an electrostatic capacitance formed between said face electrodes and said guard electrodes is smaller than a value of the electrostatic capacitance between said fluid to be measured and said face electrodes.

2. The capacitative electromagnetic flow meter according to claim 1, wherein an epoxy resin is used to fill a space between said measurement tube and said cylindrical yoke and a space between said measurement tube and said face electrodes and guard electrodes, respectively, and to fix said epoxy resin.

3. A capacitative electromagnetic flow meter comprising:

a measurement tube made of insulating material through which flows a fluid to be measured;

exciting means arranged facing a periphery of said measurement tube, that supplies flux in a direction orthogonal to a tube axis direction of said measurement tube;

a pair of face electrodes arranged facing a periphery of an outer wall of said measurement tube in directions respectively orthogonal to a direction of said flux and said tube axis direction of said measurement tube;

guard electrodes arranged so as to cover said face electrodes from said periphery of said outer wall, maintaining a prescribed separation with said face electrodes;

an exciting circuit that supplies an exciting current of a frequency of at least a commercially available frequency to said exciting coil;

a pre-amplifier that amplifies a detection signal detected through an electrostatic capacitances between said fluid to be measured and said pair of face electrodes, respectively, and between said face electrodes and said respective guard electrodes;

a cable whereby said face electrodes and guard electrodes are connected with said pre-amplifier;

a signal processing unit that outputs a flow rate of said fluid to be measured from an output signal of said pre-amplifier;

a cylindrical yoke forming a magnetic return circuit of an exciting magnetic field arranged coaxially with said measurement tube at a periphery of said exciting coil;

a coil fixing plate of non-magnetic material electrically configured and fixed to said cylindrical yoke, fixing said exciting coil; and an earth ring provided at both ends of said measurement tube, whereby a metal pipe that is coaxially arranged with said cylindrical yoke and said cylindrical yoke are configured and fixed symmetrically and electrically connected with respect to an axis connecting centers of said pair of face electrodes and a tube axis of said measurement tube, at a periphery of said cylindrical yoke;

wherein said coil fixing plate and said cylindrical yoke have both ends cut away in a direction of said tube axis, in a shape of a line where a central axial plane of a flux that intersects orthogonally a center of said tube axis of said measurement tube intersects a periphery of said cylindrical yoke.

4. The capacitative electromagnetic flow meter according to claim 3, wherein said cutaway shape is adjusted by making a dimension in a direction of an axis joining centers of said pair of face electrodes a minimum and adjusting a dimension in a tube axis direction of said measurement tube.

5. The capacitative electromagnetic flow meter according to claim 3, wherein said pre-amplifier is inserted in a head between a detection unit and signal processing unit and an interior of said detection unit that is surrounded by said measurement tube, and said metal pipe and said earth ring and an entire interior of said detection unit as far as said head is filled and fixed with an epoxy resin.

6. The capacitative electromagnetic flow meter according to claim 3, wherein a surface of said face electrodes and said guard electrodes is coated with a soft rubber and a space between said measurement tube and said cylindrical yoke and a space between said measurement tube and said face electrodes and guard electrodes are filled and fixed with an epoxy resin.

7. The capacitative electromagnetic flow meter according to claim 6, wherein, as said soft rubber, silicone resin is applied.

* * * * *